US009632963B2

(12) United States Patent
Yi et al.

(10) Patent No.: US 9,632,963 B2
(45) Date of Patent: Apr. 25, 2017

(54) SYSTEM AND METHOD FOR TRANSMITTING DATA BASED ON PCIE

(71) Applicant: Huawei Technologies Co., Ltd., Shenzhen, Guangdong (CN)

(72) Inventors: Chang Yi, Shenzhen (CN); Jing Wang, Shenzhen (CN); Dexian Su, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 574 days.

(21) Appl. No.: 14/193,217

(22) Filed: Feb. 28, 2014

(65) Prior Publication Data

US 2014/0181354 A1 Jun. 26, 2014

Related U.S. Application Data

(63) Continuation of application No. PCT/CN2013/080943, filed on Aug. 7, 2013.

(30) Foreign Application Priority Data

Dec. 11, 2012 (CN) .......................... 2012 1 0531995

(51) Int. Cl.
*G06F 13/24* (2006.01)
*G06F 13/40* (2006.01)

(52) U.S. Cl.
CPC .. *G06F 13/4022* (2013.01); *G06F 2213/0026* (2013.01)

(58) Field of Classification Search
CPC .......... G06F 13/00; G06F 13/36; G06F 13/40; G06F 13/385; G06F 13/4022

(Continued)

(56) References Cited

U.S. PATENT DOCUMENTS

| 2012/0005539 | A1  | 1/2012 | Paul et al. |
| 2014/0019667 | A1* | 1/2014 | Shimada ............... G06F 3/0605 710/316 |
| 2014/0112131 | A1* | 4/2014 | Todaka ............... G06F 13/4022 370/230 |

FOREIGN PATENT DOCUMENTS

| CN | 101277196 A | 10/2008 |
| CN | 102521182 A | 6/2012 |
| CN | 103023824 A | 4/2013 |

OTHER PUBLICATIONS

Kwok Kong:"Using PCI Express As the Primary System Interconnect in Multiroot Compute , Storage,Communications and Embedded Systems", XP055156731, Aug. 28, 2008, total 12 pages.

(Continued)

*Primary Examiner* — Tim T Vo
*Assistant Examiner* — Kim T. Huynh

(57) ABSTRACT

Embodiments of the present invention provide a system and a method for transmitting data based on Peripheral Component Interconnect Express 9PCIe). The system includes: a PCIe switching network, multiple switch terminal devices, a managing unit, multiple host processing units, multiple terminal processing units, multiple hosts, and multiple terminal devices. After a PCIe data packet sent by a host is processed by a host processing unit, a new PCIe data packet that can be transmitted in a PCIe switch is constructed, and is transferred, by using a switch terminal device and a terminal processing unit, to a terminal device. The embodiments can break through a limitation about a single root node of PCIe and implement sharing of a PCIe switching network by multiple hosts.

18 Claims, 7 Drawing Sheets

(58) Field of Classification Search
USPC .............. 710/313, 316–317, 305–306, 110
See application file for complete search history.

(56) References Cited

OTHER PUBLICATIONS

"ITD™ 89HPES16NT2 PCI Express Switch User Manual", XP055156732, Apr. 2008, total 292 pages.
"IDT™ 89HPES64H16 PCI Express Switch User Manual", XP055156733, Oct. 2008, total 186 pages.

* cited by examiner

SYSTEM AND METHOD FOR TRANSMITTING DATA BASED ON PCIE

CROSS-REFERENCE TO RELATED APPLICATIONS

This application is a continuation of International Application No. PCT/CN2013/080943, filed on Aug. 7, 2013, which claims priority to Chinese Patent Application No. 201210531995.5, filed on Dec. 11, 2012, both of which are hereby incorporated by reference in their entireties.

TECHNICAL FIELD

The present invention relates to a Peripheral Component Interconnect Express (PCIe) system, and in particular, to a system and a method for transmitting data based on Peripheral Component Interconnect Express PCIe.

BACKGROUND

A Peripheral Component Interconnect Express (PCIe) bus is a third-generation input/output (I/O) local bus standard developed on a basis of a Peripheral Component Interconnect (PCI) bus and a PCI-X bus. A standard PCI Express system is a tree topology structure, and its major components include a root node (root complex, or RC), several switches (SW), and several terminal devices (referred to as endpoints, or EPs).

In a current phase, to break through a limitation that only a single RC can exist in a PCIe system and to implement sharing of a PCIe switching network by multiple hosts, a virtual switch mode (Virtual Switch Mode) technology is applied. That is, multiple SWs are virtualized in a PCIe SW, and each virtual switch (Virtual Switch) has an upstream port (upstream port) that connects to a host (Host) and has multiple downstream ports (downstream port) that connect to EP devices. Each Virtual Switch is completely independent of and isolated from each other. In a PCIe chip, it can be implemented that multiple upstream ports support multiple Hosts, port migration, and failover (Failover).

In a process of implementing embodiments of the present invention, the inventor finds that in the prior art, PCIe supports only a maximum of eight Hosts because a chip supports only a maximum of eight upstream ports. Therefore, due to the port limitation, sharing a PCIe switching network by more hosts still cannot be implemented.

SUMMARY

Embodiments of the present invention provide a system and a method based on a Peripheral Component Interconnect Express PCIe tunnel, so as to resolve a problem in the prior art that sharing a PCIe switching network by more hosts cannot be implemented due to a port limitation of an existing chip.

According to a first aspect, an embodiment of the present invention provides a system based on a Peripheral Component Interconnect Express PCIe tunnel. The system includes:

a PCIe switch, which has one upstream port and multiple downstream ports;

a managing unit, which connects to the upstream port of the PCIe switch;

multiple switch terminal devices, which separately connect to the multiple downstream ports in a one-to-one manner;

multiple host processing units, configured to connect to hosts; and multiple terminal processing units, configured to connect to terminal devices; where:

the multiple switch terminal devices further separately connect to the multiple host processing units or the multiple terminal processing units in a one-to-one manner;

the managing unit is configured to establish a first path rule, where the first path rule includes a routing path for routing based on the PCIe switch between the switch terminal devices that connect to the PCIe switch;

the host processing unit stores a second path rule, where the second path rule includes a correspondence between a first destination switch terminal device that needs to be passed through when the host processing unit transmits a first PCIe data packet according to the first path rule to a destination terminal device and the destination terminal device, the destination terminal device is a terminal device that needs to receive the first PCIe data packet sent by the host, and the first destination switch terminal device is a switch terminal device that connects to the destination terminal device by using the terminal processing unit among the multiple switch terminal devices;

the host processing unit is further configured to receive the first PCIe data packet sent by the host that connects to the host processing unit, where the first PCIe data packet carries a data payload and terminal routing information of the destination terminal device; determine, according to the second path rule and the terminal routing information, the first destination switch terminal device that corresponds to the destination terminal device, and construct, based on the first PCIe data packet, a second PCIe data packet that can be routed from a first source switch terminal device to the first destination switch terminal device, where the first source switch terminal device is a switch terminal device that connects to the host processing unit; and send the constructed second PCIe data packet to the first source switch terminal device, so that the first source switch terminal device routes the second PCIe data packet to the first destination switch terminal device according to the first path rule, where the second PCIe data packet includes the data payload;

after receiving the second PCIe data packet, the first destination switch terminal device sends the second PCIe data packet to a destination terminal processing unit, where the destination terminal processing unit is a terminal processing unit that connects to the first destination switch terminal device among the multiple terminal processing units; and after receiving the second PCIe data packet, the destination terminal processing unit parses the second PCIe data packet to obtain the data payload and sends the data payload to the destination terminal device that connects to the destination terminal processing unit.

In a first possible implementation manner of the first aspect, the constructing, by the host processing unit, based on the first PCIe data packet, a second PCIe data packet that can be routed from a first source switch terminal device to the first destination switch terminal device includes:

parsing, by the host processing unit, the first PCIe data packet to acquire the terminal routing information and the data payload; and when the host processing unit is constructing the second PCIe data packet, using, by the host processing unit, the terminal routing information of the destination terminal device and the data payload as a data payload of the second PCIe data packet, and adding routing information of the first destination switch terminal device, so that the second PCIe data packet can be routed from the first source switch terminal device to the first destination switch terminal device by using the PCIe switch.

With reference to the first aspect and the first possible implementation manner of the first aspect, in a second possible implementation manner, the managing unit allocates, when the PCIe switch is powered on, corresponding device information to the switch terminal devices that connect to the PCIe switch, where the device information includes a first BDF number and a first BAR space address;

the first path rule is a configuration table, where the configuration table includes a routing path established according to the first BDF number or the first BAR space address between the switch terminal devices;

the first PCIe data packet further includes: a PCIe data type; and the sending the constructed second PCIe data packet to the first source switch terminal device, so that the first source switch terminal device routes the second PCIe data packet to the first destination switch terminal device according to the first path rule includes:

sending the constructed second PCIe data packet to the first source switch terminal device, so that the first source switch terminal device selects, according to the PCIe data type, the routing path established according to the first BDF number or the first BAR space address between the switch terminal devices from the configuration table, and routes the second PCIe data packet to the destination terminal device.

With reference to the first aspect, the first and the second possible implementation manners of the first aspect, in a third possible implementation manner, the managing unit is specifically configured to:

perform PCIe initialization enumeration to allocate routing information to the switch terminal devices; and establish the first path rule according to the allocated routing information.

With reference to the third possible implementation manner of the first aspect, in a fourth possible implementation manner, the host processing unit is further configured to acquire, after the managing unit establishes the first path rule, the routing path between the switch terminal devices that is included in the first path rule; and the host processing unit is further configured to, according to the path between the switch terminal devices that is included in the first path rule, the second path rule in a PCIe initialization enumeration process of the terminal devices, and store the second path rule, where the PCIe initialization enumeration process is initiated after the first path rule is established.

With reference to the first aspect and the first, the second, the third, and the fourth possible implementation manners of the first aspect, in a fifth possible implementation manner, the host processing unit includes a constructing unit and multiple levels of P2Ps defined in a PCIe specification, where a first level of P2Ps includes a first P2P, the first P2P is configured to connect to the host, a second level of P2Ps includes one or more second P2Ps, the first P2P connects to the one or more second P2Ps, and each second P2P connects to the constructing unit;

the first P2P is configured to receive the first PCIe data packet sent by the host, select, according to the terminal routing information, a second P2P that connects to the first P2P, and send the first PCIe data packet to the constructing unit; and the constructing unit is configured to determine, according to the stored second path rule and the terminal routing information, the first destination switch terminal device that corresponds to the destination terminal device; construct, based on the first PCIe data packet received by the host processing unit, the second PCIe data packet that can be routed from the first source switch terminal device to the first destination switch terminal device by using the PCIe switch; and transmit the second PCIe data packet to the first source switch terminal device, where the second path rule includes the correspondence between the destination switch terminal device that needs to be passed through when the PCIe data packet is transmitted to the destination terminal device and the destination terminal device.

With reference to the first aspect and the first, the second, the third, the fourth, and the fifth possible implementation manners of the first aspect, in a sixth possible implementation manner, the terminal processing unit includes a third path rule, where the third path rule includes a correspondence between a second destination switch terminal device that needs to be passed through when the terminal processing unit sends a third PCIe data packet to a destination host and the destination host, the destination host is a host that needs to receive the third PCIe data packet sent by the terminal processing unit, and the second destination switch terminal device is a switch terminal device that connects to the destination host by using the host processing unit among the multiple switch terminal devices;

the terminal processing unit is further configured to receive the third PCIe data packet sent by the terminal device that connects to the terminal processing unit, where the third PCIe data packet carries a data payload and host routing information of the destination host; determine, according to the third path rule and the host routing information, the second destination switch terminal device that corresponds to the destination host, and construct, based on the third PCIe data packet, a fourth PCIe data packet that can be routed from a second source switch terminal device to the second destination switch terminal device, where the second source switch terminal device is a switch terminal device that connects to the terminal processing unit; and send the constructed fourth PCIe data packet to the second source switch terminal device, so that the second source switch terminal device routes the fourth PCIe data packet to the second destination switch terminal device according to the first path rule, where the fourth PCIe data packet includes the data payload;

after receiving the fourth PCIe data packet, the second destination switch terminal device sends the fourth PCIe data packet to a destination host processing unit, where the destination host processing unit is a host processing unit that connects to the second destination switch terminal device among the multiple host processing units; and after receiving the fourth PCIe data packet, the destination host processing unit parses the fourth PCIe data packet to obtain the data payload and sends the data payload to the destination host that connects to the destination host processing unit.

According to a second aspect, an embodiment of the present invention provides a method for transmitting data based on Peripheral Component Interconnect Express PCIe. The method includes:

receiving, by a host processing unit, a first PCIe data packet sent by a host that connects to the host processing unit, where the first PCIe data packet carries a data payload and terminal routing information of a destination terminal device, and the destination terminal device is a terminal device that needs to receive the first PCIe data packet sent by the host;

determining, according to a stored second path rule and the terminal routing information, a destination switch terminal device that corresponds to the destination terminal device, where the second path rule includes a correspondence between the destination switch terminal device that needs to be passed through when the host processing unit transmits the first PCIe data packet to the destination terminal device and the destination terminal device;

constructing, based on the first PCIe data packet, a second PCIe data packet that can be routed by using a PCIe switch from a source switch terminal device that connects to the host processing unit to the destination switch terminal device; and sending the constructed second PCIe data packet to the source switch terminal device, so that the source switch terminal device routes the second PCIe data packet by using the PCIe switch to the destination switch terminal device according to a first path rule, where the second PCIe data packet includes the data payload, so that after receiving the second PCIe data packet the destination switch terminal device sends the second PCIe data packet to a destination terminal processing unit that connects to the destination switch terminal device, and so that after receiving the second PCIe data packet the destination terminal processing unit parses the second PCIe data packet to obtain the data payload and sends the data payload to the destination terminal device that connects to the destination terminal processing unit, where the first path rule includes a routing path for routing based on the PCIe switch between the switch terminal devices that connect to the PCIe switch, the source switch terminal device is a switch terminal device that connects to the host processing unit, and the destination terminal processing unit is a terminal processing unit that connects to the destination switch terminal device among the multiple terminal processing units.

In a first possible implementation manner of the second aspect, the constructing, based on the first PCIe data packet, a second PCIe data packet that can be routed by using a PCIe switch from a source switch terminal device that connects to the host processing unit to the destination switch terminal device includes:

parsing the first PCIe data packet to acquire the terminal routing information and the data payload; and when the second PCIe data packet is being constructed, using the terminal routing information of the destination terminal device and the data payload as a data payload of the second PCIe data packet, and adding routing information of the destination switch terminal device, so that the second PCIe data packet can be routed from the source switch terminal device to the destination switch terminal device by using the PCIe switch.

With reference to the second aspect and the first possible implementation manner of the second aspect, in a second possible implementation manner, the first PCIe data packet further includes: a PCIe data type; and the sending the constructed second PCIe data packet to the source switch terminal device, so that the source switch terminal device routes the second PCIe data packet by using the PCIe switch to the destination switch terminal device according to the first path rule includes:

sending the constructed second PCIe data packet to the source switch terminal device, so that the source switch terminal device selects, according to the PCIe data type, the routing path established according to a first BDF number or a first BAR space address between the switch terminal devices from a configuration table, and routes the second PCIe data packet to the destination terminal device; where:

the configuration table is used to denote the first path rule, the configuration table includes the routing path established according to the first BDF number or the first BAR space address between the switch terminal devices, and the first BDF number and the first BAR space address are obtained when they are allocated, during power-on of the PCIe switch, by a managing unit to the switch terminal devices that connect to the PCIe switch.

With reference to the second aspect and the first and the second possible implementation manners of the second aspect, in a third possible implementation manner, the first path rule is established by the managing unit according to allocated routing information, where the managing unit connects to an upstream port of the PCIe switch, and the routing information is allocated by the managing unit to the switch terminal devices by using PCIe initialization enumeration.

With reference to the second aspect and the first, the second, and the third possible implementation manners of the second aspect, in a fourth possible implementation manner, after the first path rule is established, the host processing unit acquires the path between the switch terminal devices that is included in the first path rule; and generates the second path rule in a PCIe initialization enumeration process of the terminal devices, and stores the second path rule, where the PCIe initialization enumeration process is initiated by the host after the first path rule is established.

According to a third aspect, an embodiment of the present invention provides an apparatus for transmitting data based on Peripheral Component Interconnect Express PCIe. The apparatus includes:

a receiving unit, configured to receive a first PCIe data packet sent by a host, where the first PCIe data packet carries a data payload and terminal routing information of a destination terminal device, and the destination terminal device is a terminal device that needs to receive the first PCIe data packet sent by the host; and a constructing unit, configured to determine, according to a stored second path rule and the terminal routing information, a destination switch terminal device that corresponds to the destination terminal device, where the second path rule includes a correspondence between the destination switch terminal device that needs to be passed through when the first PCIe data packet is transmitted according to a first path rule to the destination terminal device and the destination terminal device; construct, based on the first PCIe data packet received by the receiving unit, a second PCIe data packet that can be routed by using a PCIe switch from a source switch terminal device to the destination switch terminal device; and transmit the second PCIe data packet constructed by the constructing unit to the source switch terminal device, so that the source switch terminal device receives the second PCIe data packet and routes the second PCIe data packet according to the first path rule to the destination switch terminal device by using the PCIe switch, so that after receiving the second PCIe data packet the destination switch terminal device sends the second PCIe data packet to a destination terminal processing unit, and so that after receiving the second PCIe data packet the destination terminal processing unit parses the second PCIe data packet to obtain the data payload and sends the data payload to the destination terminal that connects to the destination terminal processing unit, where the first path rule includes a routing path for routing based on the PCIe switch between the switch terminal devices that connect to the PCIe switch.

In a first possible implementation manner of the third aspect, the constructing unit includes:

a determining unit, configured to determine, according to the stored second path rule and the terminal routing information, the destination switch terminal device that corresponds to the destination terminal device;

a parsing unit, configured to parse the first PCIe data packet to acquire the terminal routing information and the data payload; and a packet processing unit, which connects to the parsing unit, configured to use, when the second PCIe data packet is being constructed, the terminal routing information of the destination terminal device and the data payload as a data payload of the second PCIe data packet, and add routing information of the destination switch terminal device that is determined by the determining unit, so that the second PCIe data packet can be routed from the source switch terminal device to the destination switch terminal device by using the PCIe switch.

With reference to the third aspect and the first possible implementation manner of the third aspect, in a second possible implementation manner, the receiving unit includes multiple levels of P2Ps defined in a PCIe specification, where a first level of P2Ps includes a first P2P, the first P2P is configured to connect to the host, a second level of P2Ps includes one or more second P2Ps, the first P2P connects to the one or more second P2Ps, and each second P2P connects to the constructing unit; and the first P2P is configured to receive the first PCIe data packet sent by the host, select, according to the terminal routing information, a second P2P that connects to the first P2P, and send the first PCIe data packet to the constructing unit.

According to a fourth aspect, an embodiment of the present invention provides an apparatus for transmitting data based on Peripheral Component Interconnect Express PCIe. The apparatus includes: a host processing unit, which receives a first PCIe data packet sent by a host that connects to the host processing unit, where the first PCIe data packet carries a data payload and terminal routing information of a destination terminal device; and determines, according to a stored second path rule and the terminal routing information, a destination switch terminal device that corresponds to the destination terminal device, constructs, based on the first PCIe data packet, a second PCIe data packet that can be routed from a source switch terminal device to the destination switch terminal device, and sends the second PCIe data packet, where the second path rule includes a correspondence between the destination switch terminal device that needs to be passed through when the host processing unit transmits the first PCIe data packet according to a first path rule to the destination terminal device and the destination terminal device, the destination terminal device is a terminal device that needs to receive the first PCIe data packet sent by the host, and the first path rule includes a routing path for routing based on a PCIe switch between the switch terminal devices that connect to the PCIe switch; and a source switch terminal device, which connects to the host processing unit, receives the second PCIe data packet from the host processing unit, and routes the second PCIe data packet by using the PCIe switch to the destination switch terminal device according to the first path rule, where the second PCIe data packet includes the data payload, so that after receiving the second PCIe data packet the destination switch terminal device sends the second PCIe data packet to a destination terminal processing unit, and so that after receiving the second PCIe data packet the destination terminal processing unit parses the second PCIe data packet to obtain the data payload and sends the data payload to the destination terminal that connects to the destination terminal processing unit, where the first path rule includes the routing path for the routing based on the PCIe switch between the switch terminal devices that connect to the PCIe switch.

In a first possible implementation manner of the fourth aspect, the host processing unit includes: a receiving unit, configured to receive the first PCIe data packet sent by the host, where the first PCIe data packet carries the data payload and the terminal routing information of the destination terminal device, and the destination terminal device is a terminal device that needs to receive the first PCIe data packet sent by the host; and a constructing unit, configured to determine, according to the stored second path rule and the terminal routing information, the destination switch terminal device that corresponds to the destination terminal device; construct, based on the first PCIe data packet received by the receiving unit, the second PCIe data packet that can be routed by using the PCIe switch from the source switch terminal device to the destination switch terminal device; and transmit the second PCIe data packet constructed by the constructing unit to the source switch terminal device, where the second path rule includes the correspondence between the destination switch terminal device that needs to be passed through when the first PCIe data packet is transmitted according to the first path rule to the destination terminal device and the destination terminal device, and the first path rule includes the routing path for the routing based on the PCIe switch between the switch terminal devices that connect to the PCIe switch.

With reference to the first possible implementation manner of the fourth aspect, in a second possible implementation manner, the constructing unit includes: a determining unit, configured to determine, according to the stored second path rule and the terminal routing information, the destination switch terminal device that corresponds to the destination terminal device;

a parsing unit, configured to parse the first PCIe data packet to acquire the terminal routing information and the data payload; and a packet processing unit, which connects to the parsing unit, configured to use, when the second PCIe data packet is being constructed, the terminal routing information of the destination terminal device and the data payload as a data payload of the second PCIe data packet, and add routing information of the destination switch terminal device that is determined by the determining unit, so that the second PCIe data packet can be routed from the source switch terminal device to the destination switch terminal device by using the PCIe switch.

In the system and the method for transmitting data based on Peripheral Component Interconnect Express PCIe according to the embodiments of the present invention, by arranging host processing units that correspond to hosts, terminal processing units that correspond to terminal devices and switch terminal devices, each host or each terminal device is connected by using the processing units and the switch terminal devices to a downstream port of a PCIe switch. Because a standard PCIe switch supports multiple downstream ports, a PCIe switching partition limitation can be broken through.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
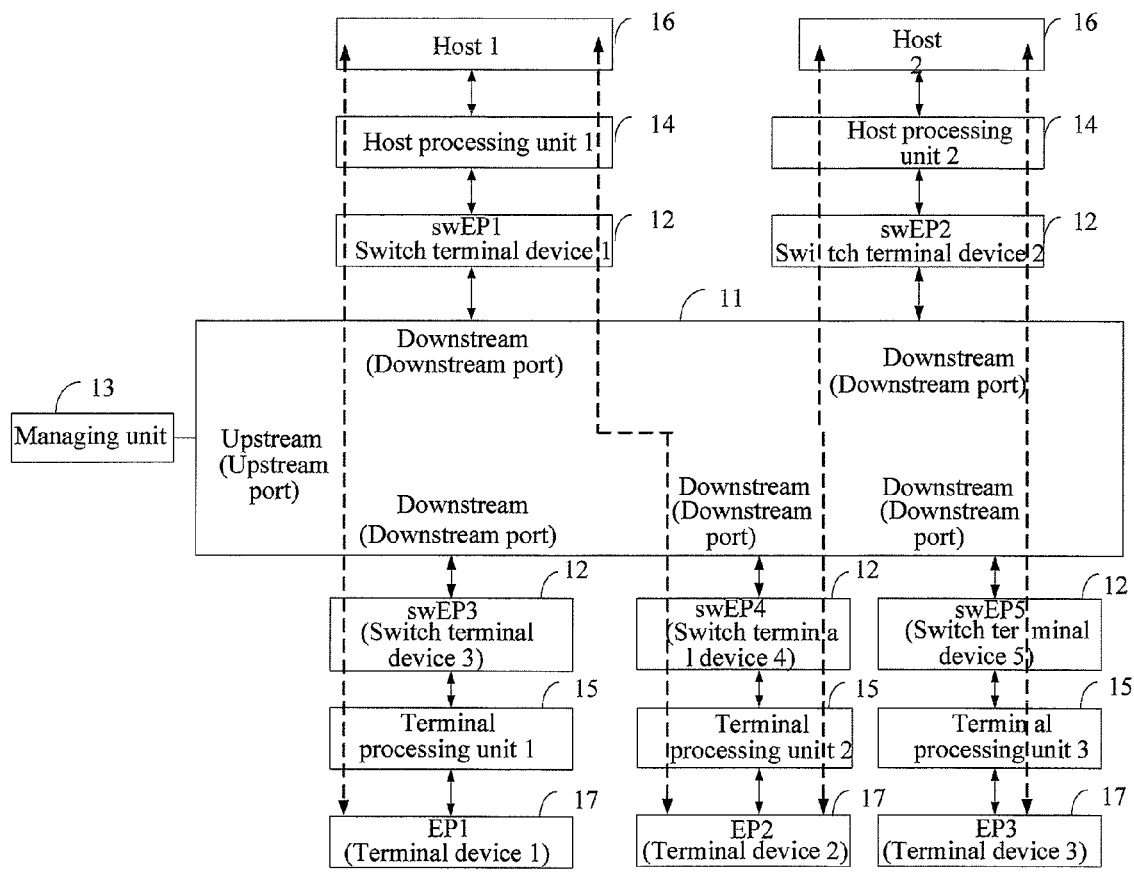
FIG. 1 is a schematic architectural diagram of a system for transmitting data based on Peripheral Component Interconnect Express (PCIe) according to the present invention.

FIG. 1 is a schematic architectural diagram of a system for transmitting data based on Peripheral Component Interconnect Express (PCIe) according to the present invention. As shown in FIG. 1, the system based on a PCIe tunnel includes: a PCIe switch 11, multiple switch terminal devices (also referred to as Switch Endpoints (swEP)) 12, a managing unit (also referred to as a Switch Manage Central Processing Unit ((MCPU)) 13, multiple host processing units 14, multiple terminal processing units 15, multiple hosts 16, and multiple terminal devices 17.

Specifically, refer to FIG. 1. The PCIe switch 11 includes one upstream port and multiple downstream ports. The managing unit 13 connects to the upstream port of the PCIe switch 11. The switch terminal devices 12 connect to the downstream ports of the PCIe switch in a one-to-one manner. A host processing unit 14 or a terminal processing unit 15 connects to a switch terminal device 12. A host 16 corresponds to a host processing unit 14. A terminal device 17 corresponds to a terminal processing unit 15.

In this embodiment of the present invention, the PCIe switch 11 has one upstream port and multiple downstream ports. The upstream port connects to the managing unit 13. Each downstream port connects to a switch terminal device 12. Each switch terminal device 12 connects to a host processing unit 14 or a terminal processing unit 15. If a switch terminal device 12 corresponds to a host, the switch terminal device 12 connects to a host processing unit 14; otherwise, if a switch terminal device 12 corresponds to a terminal device, the switch terminal device 12 connects to a terminal processing unit 15. Both a host processing unit and a terminal processing unit 15 are configured to implement similar functions, and may be uniformly referred to as "processing units". Here, names of the two are differentiated for ease of description. In addition, except that a specific host processing unit (such as a host processing unit 1) is restricted so as to specifically describe a certain example, in this embodiment, the host processing units (such as host processing units 1 and 2) are not strictly differentiated, and it may be considered that a description of a host processing unit may apply to each host processing unit.

Each processing unit (including a host processing unit 14 and a terminal processing unit 15) and each switch terminal device 12 may be implemented based on a logic device, such as a field programmable gate array (FPGA) or an application specific integrated circuit (ASIC), or based on another similar processor. Here, a switch terminal device is a terminal device (also referred to as an Endpoint (EP)) that directly connects to the PCIe switch. How to implement these switch terminal devices 12 by using logic devices or other similar processors is a well-known technology for persons of ordinary skill in the art, and no further details are provided herein. The managing unit 13 may be a CPU, and the PCIe switch 11 may use an existing PCIe switch chip. In this embodiment, an alternative physical form is that the managing unit 13 and the PCIe switch are integrated on a board; a host 16, a corresponding host processing unit 14, and a switch terminal device 12 are integrated on a board; a terminal device 17, a corresponding terminal processing unit 15, and a switch terminal device 12 are integrated on a board; and the board where the host 16 resides and the board where the terminal device 17 resides connect, by using PCIe interfaces, to the board where the PCIe switch 11 resides. Certainly, the foregoing is only a specific application implementation form, another hardware manner (for example, several terminal devices 17, terminal processing units 15, and switch terminal devices 12 are integrated on one board) may be used, and this is not limited in this embodiment.

The following describes in detail the system for transmitting data based on PCIe according to this embodiment of the present invention with reference to FIG. 1. In this embodiment, communication connections are established between a host 1 and a host 2 and terminal devices EP1, EP2, and EP3 by using the system for transmitting data.

During initial power-on of the system, the managing unit 13 finishes configuring all switch terminal devices 12 in the system, that is, it allocates corresponding device information to all switch terminal devices 12 swEP1, swEP2, swEP3, swEP4, and swEP5 that are implemented by logic devices (such as FPGAs). Then the managing unit establishes a first path rule by using PCIe initialization enumeration according to the allocated device information, where the first path rule includes a routing path for PCIe-based routing between the switch terminal devices 12 that connect to the PCIe switch 11. In this embodiment, a routing path is established based on the first path rule between swEP1 and swEP3, between swEP1 and swEP4, and between swEP2 and swEP5.

The first path rule is established by the managing unit 13. Specifically, the managing unit 13 allocates routing information to each switch terminal device 12 during the PCIe initialization enumeration; and establishes the first path rule according to the allocated routing information.

The PCIe initialization enumeration is a process defined in a PCIe specification for a root complex (RC) node to scan and discover each EP node. In this embodiment, the managing unit 13 connects to the upstream port of the PCIe switch 11, and is one RC node; and each switch terminal device 12 connects to a downstream port of the PCIe switch 11, and is an EP node. In the enumeration process, the RC (that is, the managing unit 13) allocates routing information to the EPs (that is, the switch terminal devices 12). In PCIe, routes are classified into two types according to different types of PCIe packets. One type is an ID route, and the other type is an address route. For the ID route, BDF information is used as the routing information, where the BDF information is a joint name of a Bus (bus) number, a Device (device) number, and a Function (function) number; and for the address route, a BAR space address is used as the routing information.

After allocating the routing information, the managing unit 13 establishes the first path rule according to the allocated routing information. A definition of a path may specifically be a configuration table, where the configuration table includes a routing path established according to the BDF information or the BAR space address between the switch terminal devices.

Table 1 shows an example of the configuration table.

TABLE 1

| Path ID | Switch Terminal Device | Switch Terminal Device |
| --- | --- | --- |
| 1 | swEP1_BDF1 | swEP3_BDF3 |
| 2 | swEP1_BAR1 | swEP3_BAR3 |
| 3 | swEP1_BDF1 | swEP4_BDF4 |

In Table 1, swEP1_BDF1 indicates BDF information of swEP1, swEP1_BAR1 indicates a BAR space address of swEP1, and the rest indicate similar meanings. A first lateral entry defines a path for routing from swEP1 to swEP3 by using the BDF information. A second lateral entry defines a path for routing from swEP1 to swEP3 by using the BAR information. In practice, generally the PCIe switch needs to forward PCIe data packets of various data types (a data type of a packet is carried in the packet, and identified by some identification bits). Therefore, a path must be defined for both specific routing manners. Certainly, if it can be determined that a certain path is used only to transmit a PCIe data packet that corresponds to a specific routing manner, routing information that corresponds to the specific routing manner may also be used. For example, only BDF information or a BAR space address is used. It should be noted that the foregoing configuration table is only a configuration table used for illustration in a logical sense, and its specific implementation method is not limited in this embodiment.

The establishment of the first path rule is equivalent to providing a channel between switch terminal devices that require path establishment, and subsequently a PCIe data packet can be routed based on the first path rule between switch terminal devices at two ends of a path.

A host processing unit 14 stores a second path rule, where the second path rule includes a correspondence between a destination switch terminal device that needs to be passed through when the host processing unit 14 transmits a PCIe data packet to a destination terminal device and the destination terminal device. The destination terminal device is a terminal device that needs to receive the PCIe data packet sent by a host, and the destination switch terminal device is a switch terminal device that connects to the destination terminal device by using a terminal processing unit among the multiple switch terminal devices. For example, if the host processing unit 1 sends a first PCIe data packet to a destination terminal device EP1 by using swEP1, the host processing unit 1 needs to know which destination swEP (a switch terminal device 12) at a receive end corresponds to EP1, so that a routing address of the destination swEP can be filled, so as to transmit the first PCIe data packet in the PCIe switch 11 from swEP1 to swEP3 according to the first path rule and ultimately transmit the first PCIe data packet to EP1 that corresponds to swEP3.

In this embodiment, after the managing unit 13 establishes the first path rule, the host processing unit 14 may acquire the path between the switch terminal devices that is included in the first path rule. Specifically, the path may be acquired by using multiple methods. For example, a first path is stored in a block area for the host processing unit 14 to acquire; or the path information is sent directly by using some messages to the host processing unit 14.

The host processing unit 14 is further configured to generate, according to the path between the switch terminal devices 12 that is included in the first path rule, the second path rule in a PCIe initialization enumeration process of a terminal device 17 after the first path rule is established, and store the second path rule, where the PCIe initialization enumeration process is initiated by the host processing unit 14.

In this embodiment, the host processing unit 14 also performs the PCIe initialization enumeration for EP devices (such as EP1 and EP2) that connect to the host processing unit 14. In the enumeration process, a data packet used for the enumeration passes through each node that passes through the terminal device 17, including a terminal processing unit and a switch terminal device 12. Therefore, a destination EP that corresponds to a destination swEP can be easily acquired. For example, during the enumeration, the host 1 ultimately accesses EP1 by using the host processing unit 1 along the path swEP1-swEP3 included in the first path rule, and then the host processing unit 1 obviously knows that swEP3 corresponds to EP1 (because each swEP connects to only one terminal, the access is surely made by using swEP3, that is, swEP3 corresponds to EP1).

Figure 2:
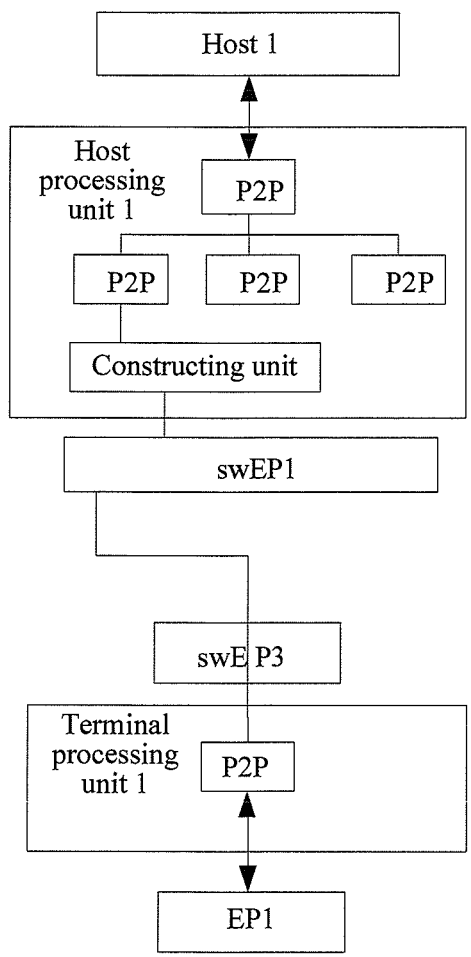
FIG. 2 is a schematic diagram of P2P generation of a host processing unit in a system for transmitting data based on PCIe according to the present invention.

The PCIe initialization enumeration needs to be completed by the RC in the PCIe switch. Therefore, when a host is performing the enumeration, the host needs to serve as one RC. FIG. 2 is a schematic diagram of P2P generation of a host processing unit in a system for transmitting data based on Peripheral Component Interconnect Express PCIe according to the present invention. Therefore, in this embodiment, a host processing unit may "simulate" a PCIe switch to enable a host to serve as one RC. Specifically, refer to FIG. 2. The host processing unit 1 is used as an example. The host processing unit may include multiple levels of P2Ps (a P2P is also called a P2P bridge, or a point-to-point device, or a point-to-point bridge). A P2P is a concept defined in a PCIe protocol. A first level of P2Ps includes a first P2P. That is, a P2P closest to the host 1 in FIG. 2 is the first P2P at the first level. The first P2P connects to the host. A second level of P2Ps includes one or more second P2Ps, and a second P2P may connect to another subunit (such as a constructing unit configured to construct a second PCIe data packet) of the host processing unit.

It should be noted that a P2P in this embodiment is only a logical concept. During specific implementation, a corresponding logic device may, in a P2P response manner defined in the PCIe specification, respond to some packets sent by a host, so that after receiving these response packets the host considers that these response packets are sent by one P2P.

The number of second-level P2Ps may be the same as the number of terminal devices that connect to the host. For example, in FIG. 1, the host 1 needs to communicate with EP1 and EP2, and then two second P2Ps are required to implement two channels. In fact, for better expansion and to better support hot plugging, in this embodiment more second P2Ps may also be generated, and these extra second P2Ps are configured to serve other EPs to newly join later.

Specifically, the host processing unit generates some extra second P2Ps. In an initialization enumeration process of the host, routing information (such as the BDF information or the BAR space address) is also allocated to these P2Ps. Later when a new EP joins (for example, in FIG. 1, a board where EP3 resides is inserted into the system and connects to the PCIe switch, and the host 1 also needs to be able to access EP3), the managing unit 13 may add a path from swEP1 to swEP5 to the first path rule, so as to provide a connection from swEP1 to swEP5. Then the host processing unit may allocate, by using one PCIe initialization enumeration again, a piece of routing information to the new EP according to routing information of an extra second P2P (if a BAR space address of the new EP is within a BAR space address range of the extra second P2P), so that subsequently a data packet can be sent to the new EP and the data packet is transferred, by using various levels of P2Ps and swEP1, to the new EP.

By using the foregoing P2Ps, the host is capable of implementing the PCIe initialization enumeration by using a depth-first algorithm to allocate routing information to a terminal device (such as EP1). In the enumeration process, a data packet to be used for the enumeration needs to pass through the PCIe switch 11. In this embodiment, because there is already the first path rule, this is equivalent to providing a channel between PCIe switch terminal devices and only routing information of a peer-end switch terminal device needs to be added (with the original packet serving as a Payload) to re-construct a new packet, and then the new packet can be transmitted between the switch terminal devices at two ends of the PCIe switch.

After acquiring the first path rule and the second path rule, the host can send a PCIe data packet to a terminal. Specifically, the system for transmitting data based on Peripheral Component Interconnect Express PCIe according to the present invention is described in detail by using an example that the host 1 sends data to EP1, where the host 1 is a source host, swEP1 is a source switch terminal device, swEP3 is a destination switch terminal device, and EP1 is a destination terminal device.

The host processing unit 1 is configured to receive the first PCIe data packet sent by the host 1 that connects to the host processing unit 1, where the first PCIe data packet carries a data payload and terminal routing information of EP1. Here, the terminal routing information may be the BDF information or the BAR space address, depending on a specific type (which is determined by a specific domain of a TLP Header field in the PCIe data packet) of the PCIe data packet, and the data payload is located in a payload field of the packet; and a most critical part of the first PCIe data packet is the data payload, that is, data that really needs to be received by a terminal device, and the other information serves to transfer the data payload to the terminal device.

The host processing unit 1 is further configured to determine, according to the second path rule and the terminal routing information, a destination switch terminal device 12 that corresponds to EP1, that is, swEP3; and construct, based on the first PCIe data packet, a second PCIe data packet that can be routed from swEP1 that connects to the host processing unit 1 to swEP3.

The destination terminal device can be known by using the terminal routing information. In addition, because the second path rule includes a correspondence between the destination switch terminal device and the destination terminal device, the destination switch terminal device swEP3 that corresponds to the destination terminal device is known.

The constructing the second PCIe data packet may be completed based on the following method:

parsing, by the host processing unit 1, the first PCIe data packet to acquire the terminal routing information and the data payload;

determining, according to the terminal routing information and the second path rule, a first destination switch terminal device swEP3 that needs to be passed through when the host processing unit 1 transmits the first PCIe data packet to the destination terminal device EP1; and when the host processing unit 1 is constructing the second PCIe data packet, using, by the host processing unit 1, the terminal routing information of the destination terminal device EP1 and the data payload as a data payload of the second PCIe data packet, and adding routing information of the first destination switch terminal device swEP3, so that the second PCIe data packet can be routed from a first source switch terminal device swEP1 to the first destination switch terminal device swEP3 by using the PCIe switch 11.

In this embodiment, a host processing unit may include a constructing unit, where the constructing unit may connect to a second P2P of the host processing unit. The constructing unit stores the second path rule, and is configured to: receive the first PCIe data packet sent by the second P2P; determine, according to the second path rule and the terminal routing information, the first destination switch terminal device that corresponds to the destination terminal device; and construct, based on the first PCIe data packet, the second PCIe data packet that can be routed from the first source switch terminal device swEP1 to the first destination switch terminal device swEP3, and transmit the second PCIe data packet constructed by the constructing unit to the first source switch terminal device swEP1.

Figure 3:
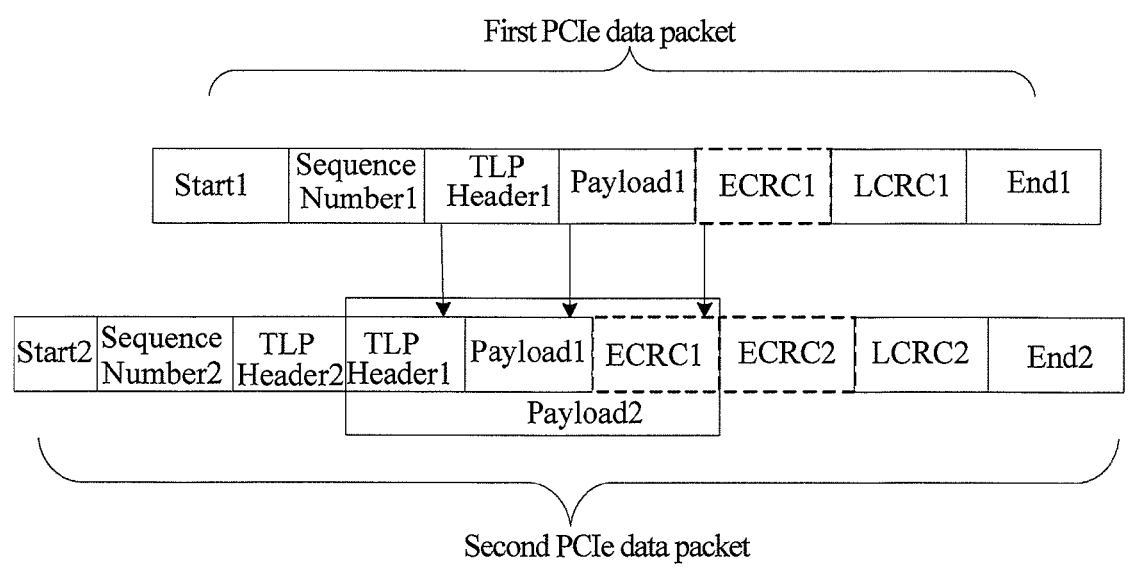
FIG. 3 is a schematic diagram of a process of constructing a second PCIe data packet according to Embodiment 1 of the present invention.

More specifically, refer to FIG. 3. FIG. 3 is a schematic diagram of a process of constructing a second PCIe data packet according to Embodiment 1 of the present invention. As shown in FIG. 3, an upper half is the first PCIe data packet, the payload is a Payload1, and the terminal routing information is included in a TLP Header1. A lower half in FIG. 3 is the second PCIe data packet; when the second PCIe data packet is being constructed, a TLP Header1, the Payload1, and ECRC1 (optional) in the first PCIe data packet serve as the Payload (that is, Payload2 in the figure) of the second PCIe data packet; and the routing information of the destination switch terminal device (swEP3) is added to a TLP Header2 of the second PCIe data packet so that the second PCIe data packet can be routed to swEP3 by using the PCIe switch 11. It should be noted that the foregoing construction manner is not unique. In addition to the TLP Header1, the Payload1, and the ECRC1 (optional) that can serve as the Payload of the second PCIe data packet, another field in the first PCIe data packet may also be used. Even the entire first PCIe data packet may be used as the Payload of the second PCIe data packet (as long as a size of the Payload2 is greater than a size of the first PCIe data packet). Here, a major purpose of constructing the second PCIe data packet is to transfer the data payload in the first PCIe data packet to the destination switch terminal device by using the PCIe switch.

The host processing unit 1 is further configured to send the constructed second PCIe data packet to swEP1, so that swEP1 routes the second PCIe data packet to swEP3 according to the first path rule, where the second PCIe data packet includes the data payload. Because the first path rule has already provided channels between the switch terminal devices, the second PCIe data packet can be routed to the destination switch terminal device swEP3 by using the routing information of the destination switch terminal device in the TLP Header2.

After receiving the second PCIe data packet, swEP3 sends the second PCIe data packet to a destination terminal processing unit 1 that connects to swEP3. After receiving the second PCIe data packet, the destination terminal processing unit 1 parses the second PCIe data packet to obtain the data payload and sends the data payload to the destination terminal device EP1 that connects to the destination terminal processing unit 1. Because a correspondence between the destination terminal processing unit 1 and the destination terminal device EP1 is determined, after the second PCIe data packet is received, the data payload obtained by using the parsing can be directly sent to the destination terminal device. Persons of ordinary skill in the art can easily implement the step of sending, by the destination terminal processing unit, the data payload to the destination terminal device. By using the foregoing step, a process of sending a data payload in a PCIe data packet to a terminal is implemented, where the PCIe data packet is sent by a host.

Similarly, if the entire PCIe data packet is encapsulated, the entire PCIe data packet may be obtained by using parsing and then the data payload is obtained by using parsing; or the first PCIe data packet is directly sent to the terminal, instead of being parsed to obtain the data payload, and the terminal device performs the parsing. These are equivalent implementation manners, and no further details are provided herein.

Similarly, the terminal device may also send a data packet to the host, and the process is similar to the process of sending, by the host, a data packet to the terminal device. In this case, the terminal processing unit includes a third path rule, where the third path rule includes a correspondence between a second destination switch terminal device that needs to be passed through when the terminal processing unit sends a third PCIe data packet to a destination host and the destination host, the destination host is a host that needs to receive the third PCIe data packet sent by the terminal processing unit, and the second destination switch terminal device is a switch terminal device that connects to the destination host by using the host processing unit among the multiple switch terminal devices. Here, for acquiring of the third path rule, reference may be made to acquiring of the second path rule, and no further details are provided herein.

The terminal processing unit is further configured to receive the third PCIe data packet sent by the terminal device that connects to the terminal processing unit, where the third PCIe data packet carries a data payload and host routing information of the destination host; determine, according to the third path rule and the host routing information, the second destination switch terminal device that corresponds to the destination host, and construct, based on the third PCIe data packet, a fourth PCIe data packet that can be routed from a second source switch terminal device to the second destination switch terminal device, where the second source switch terminal device is a switch terminal device that connects to the terminal processing unit; and send the constructed fourth PCIe data packet to the second source switch terminal device, so that the second source switch terminal device routes the fourth PCIe data packet to the second destination switch terminal device according to the first path rule, where the fourth PCIe data packet includes the data payload; after receiving the fourth PCIe data packet, the second destination switch terminal device sends the fourth PCIe data packet to the destination host processing unit, where the destination host processing unit is a host processing unit that connects to the second destination switch terminal device among the multiple host processing units; and after receiving the fourth PCIe data packet, the destination host processing unit parses the fourth PCIe data packet to obtain the data payload and sends the data payload to the destination host that connects to the destination host processing unit.

It should be noted that in the example in this embodiment, the host 1 communicates with EP1. In practice each host may perform similar operations to access its own corresponding terminal device, and no further details are provided herein.

It should be further noted that the units such as the host/terminal processing units and the switch terminal devices in this embodiment are merely logical function division, and do not imply that "hardware" units exist in an actual device in one-to-one correspondence. It may be understood that functions of these units may also be implemented by another logic module or even another piece of hardware. For example, a logic module (the constructing unit) configured to construct the second PCIe data packet in the host processing unit may actually be implemented on an swEP (that is, after receiving the first PCIe data packet, the swEP constructs and sends the second PCIe data packet), or implemented by another new module, or even implemented by a newly added hardware unit (such as adding another logic device). These technologies are well-known technologies for persons of ordinary skill in the art and are all solutions equivalent to this embodiment, and no further details are provided herein.

In a system for transmitting data based on PCIe according to this embodiment of the present invention, after a host processing unit processes a PCIe data packet sent by a host, a new PCIe data packet is constructed and transmitted in a PCIe switch and sent by using a terminal processing unit to a terminal device. In this way, it is implemented that the host accesses the terminal device. In this embodiment, not all hosts need to connect to an RC (an upstream port) of the PCIe switch, but they may indirectly connect to downstream ports. Because there is no limit on the number of downstream ports on an existing PCIe switch, more hosts can share a PCIe switching network so as to access terminal devices.

In addition, in this embodiment, a PCIe protocol is easy to implement, and a length of a TLP Header in PCIe is not great (its size is 3DW or 4DW). Therefore, during construction and transmission of a new PCIe data packet, overheads are not high and a transmission delay is short, so that this solution is more valuable for use in a communications system.

Embodiment 2

Figure 4:
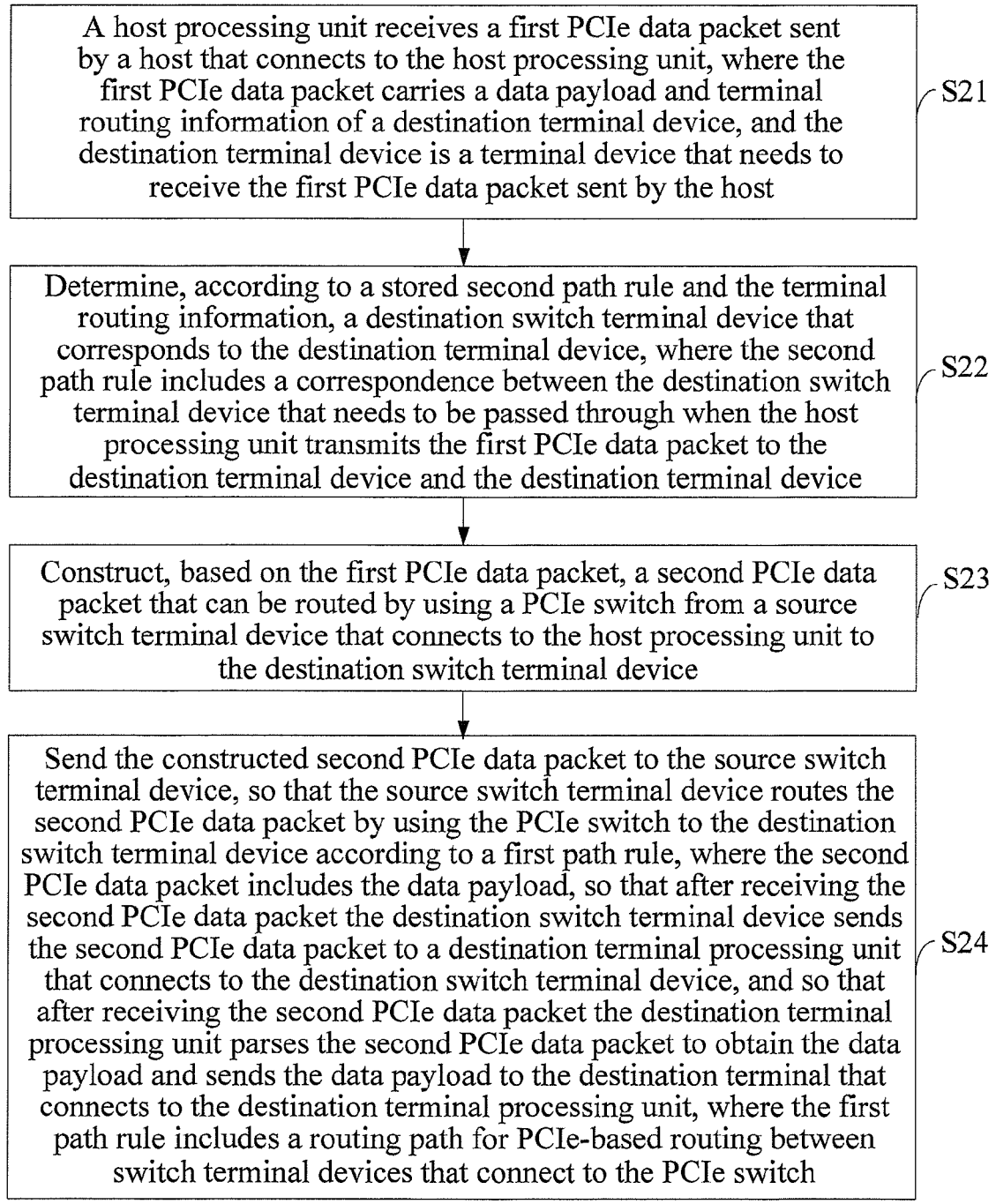
FIG. 4 is a schematic flowchart of a method for transmitting data based on PCIe according to Embodiment 2 of the present invention.

On a basis of Embodiment 1, this embodiment provides a method for transmitting data based on PCIe. FIG. 4 is a schematic flowchart of a method for transmitting data based on PCIe according to Embodiment 2 of the present invention. Refer to FIG. 4. The method includes the following steps:

S21. A host processing unit receives a first PCIe data packet sent by a host that connects to the host processing unit, where the first PCIe data packet carries a data payload and terminal routing information of a destination terminal device, and the destination terminal device is a terminal device that needs to receive the PCIe data packet sent by the host.

S22. Determine, according to a stored second path rule and the terminal routing information, a destination switch terminal device that corresponds to the destination terminal device, where the second path rule includes a correspondence between the destination switch terminal device that needs to be passed through when the host processing unit transmits the first PCIe data packet to the destination terminal device and the destination terminal device.

S23. Construct, based on the first PCIe data packet, a second PCIe data packet that can be routed by using a PCIe switch from a source switch terminal device that connects to the host processing unit to the destination switch terminal device.

S24. Send the constructed second PCIe data packet to the source switch terminal device, so that the source switch terminal device routes the second PCIe data packet by using the PCIe switch to the destination switch terminal device according to a first path rule, where the second PCIe data packet includes the data payload, so that after receiving the second PCIe data packet the destination switch terminal device sends the second PCIe data packet to a destination terminal processing unit that connects to the destination switch terminal device, and so that after receiving the second PCIe data packet the destination terminal processing unit parses the second PCIe data packet to obtain the data payload and sends the data payload to the destination terminal that connects to the destination terminal processing unit, where the first path rule includes a routing path for PCIe-based routing between switch terminal devices that connect to the PCIe switch.

Specifically, the constructing, based on the first PCIe data packet, a second PCIe data packet that can be routed from a source switch terminal device that connects to the host processing unit to the destination switch terminal device includes:

parsing the first PCIe data packet to acquire the terminal routing information and the data payload;

determining, according to the terminal routing information and the second path rule, the destination switch terminal device that needs to be passed through when the host processing unit transmits the PCIe data packet to the destination terminal device; and when the second PCIe data packet is being constructed, using the terminal routing information of the destination terminal device and the data payload as a data payload of the second PCIe data packet, and adding routing information of the destination switch terminal device, so that the second PCIe data packet can be routed from the source switch terminal device to the destination switch terminal device by using the PCIe switch.

In this embodiment, the first PCIe data packet further includes: a PCIe data type; and in the preceding step, the sending the constructed second PCIe data packet to the source switch terminal device, so that the source switch terminal device routes the second PCIe data packet by using the PCIe switch to the destination switch terminal device according to a first path rule includes:

sending the constructed second PCIe data packet to the source switch terminal device, so that the source switch terminal device selects, according to the PCIe data type, the routing path established according to a first BDF number or a first BAR space address between the switch terminal devices from a configuration table, and routes the second PCIe data packet to the destination terminal device; where:

the configuration table is used to denote the first path rule, the configuration table includes the routing path established according to the first BDF number or the first BAR space address between the switch terminal devices, and the first BDF number and the first BAR space address are obtained when they are allocated, during power-on of the PCIe switch, by a managing unit to the switch terminal devices that connect to the PCIe switch.

In this embodiment, the first path rule is established by the managing unit according to allocated routing information, where the managing unit connects to an upstream port of the PCIe switch, and the routing information is allocated by the managing unit to each switch terminal device by using PCIe initialization enumeration.

The method according to this embodiment further includes:

acquiring, by the host processing unit after the first path rule is established, the path between the switch terminal devices that is included in the first path rule; and generating the second path rule in a PCIe initialization enumeration process of the terminal devices according to the path between the switch terminal devices that is included in the first path rule, and storing the second path rule, where the PCIe initialization enumeration process is initiated by the host after the first path rule is established.

Because this embodiment is described based on Embodiment 1, persons of ordinary skill in the art may refer to Embodiment 1 for sub-division of a specific step in this embodiment, or supplements to other steps, or explanation of various concepts, and no further details are provided herein.

Embodiment 3

Figure 5:
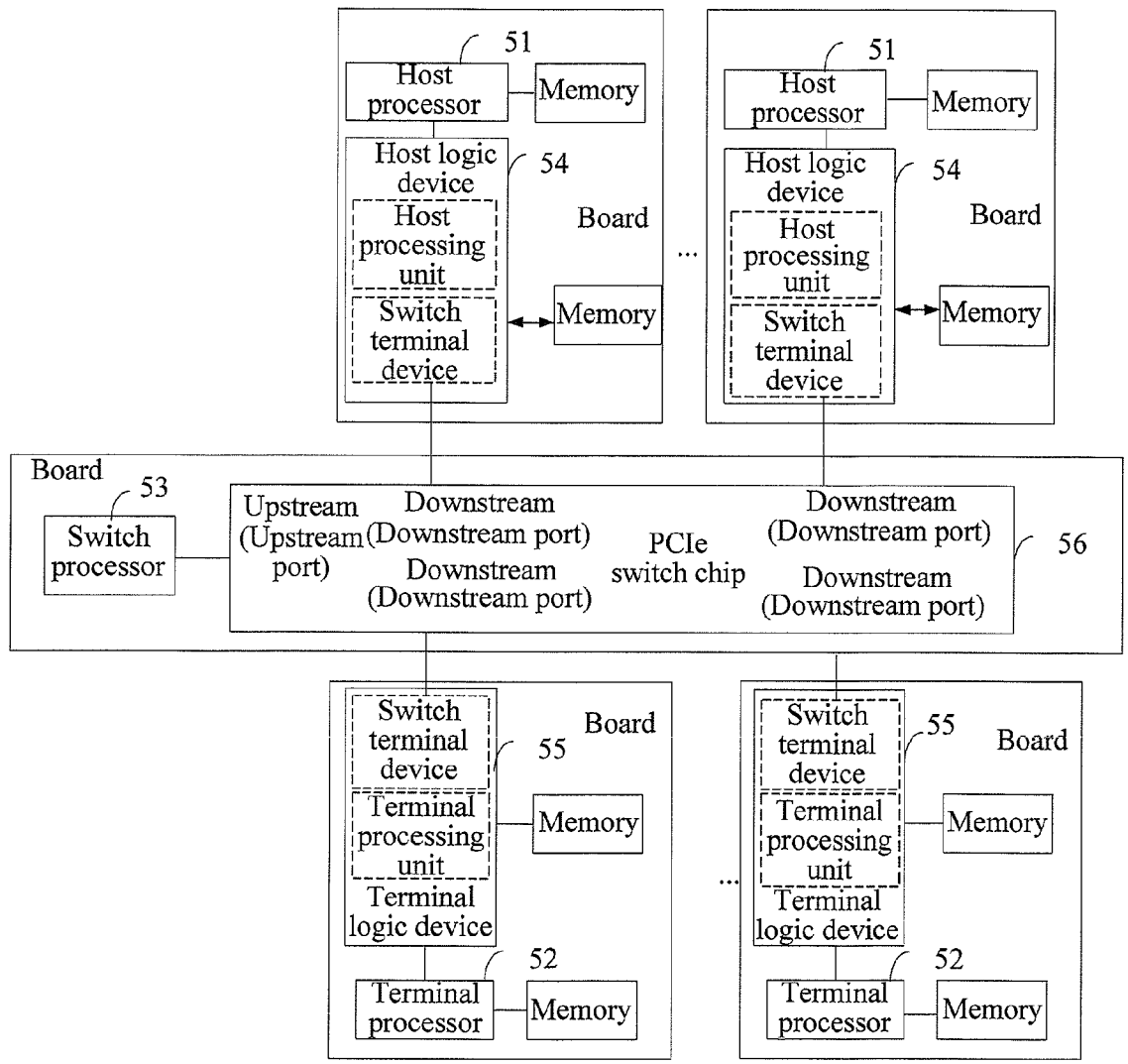
FIG. 5 is a schematic structural diagram of a PCIe data transmission system implemented on a basis of specific hardware according to Embodiment 3 of the present invention.

On a basis of the foregoing embodiments, this embodiment provides a system for transmitting data based on PCIe. FIG. 5 is a schematic structural diagram of a PCIe data transmission system implemented on a basis of specific hardware according to Embodiment 3 of the present invention. Referring to FIG. 5, the system for transmitting data based on PCIe according to this embodiment includes:

a PCIe switch chip 56;

a switch processor 53, configured to connect to an upstream port of the chip of the PCIe switch chip 56;

multiple host logic devices 54, each of which connects to a host processor 51 and connects to a downstream port of the PCIe switch chip 56; and multiple terminal logic devices 55, each of which connects to a terminal processor 52 and connects to a downstream port of the PCIe switch chip 56.

In this embodiment, the switch processor 53 and the PCIe switch 56 may be located on one board, a host processor 51 and a host logic device 54 may be located on one board, and a terminal processor 52 and a terminal logic device 55 may be located on one board. Certainly, in another embodiment, such hardware division is not limited.

In this embodiment, both a host processor 51 and a terminal processor 52 are processors such as CPUs, and are configured to implement functions of a host and functions of a terminal in Embodiment 1, respectively. Both a host logic device and a terminal logic device 55 are logic devices such as FPGAs or ASICs, and are configured to implement functions of a host processing unit 14 and a switch terminal device 12, and functions of a terminal processing unit 15 and a switch terminal device 12 in Embodiment 1, as shown in dashed-line parts in FIG. 1. Each processor and each logic device may externally connect to a memory, which is configured to store code that is required for program running or data that is required for program running. If a CPU chip or an FPGA chip has a sufficient memory on its own, the memory does not need to be externally connected.

Each processor executes the functions of a host in Embodiment 1 by reading the code stored in the memory; and each logic device executes functions of each processing unit in this embodiment by logic programming or reading corresponding code (generally a logic device integrates a processor). Specifically, the functions of each unit have been introduced in detail in Embodiment 1, and persons of ordinary skill in the art may implement functions of each module in this embodiment according to hardware in this embodiment, and no further details are provided herein.

Embodiment 4

Figure 6:
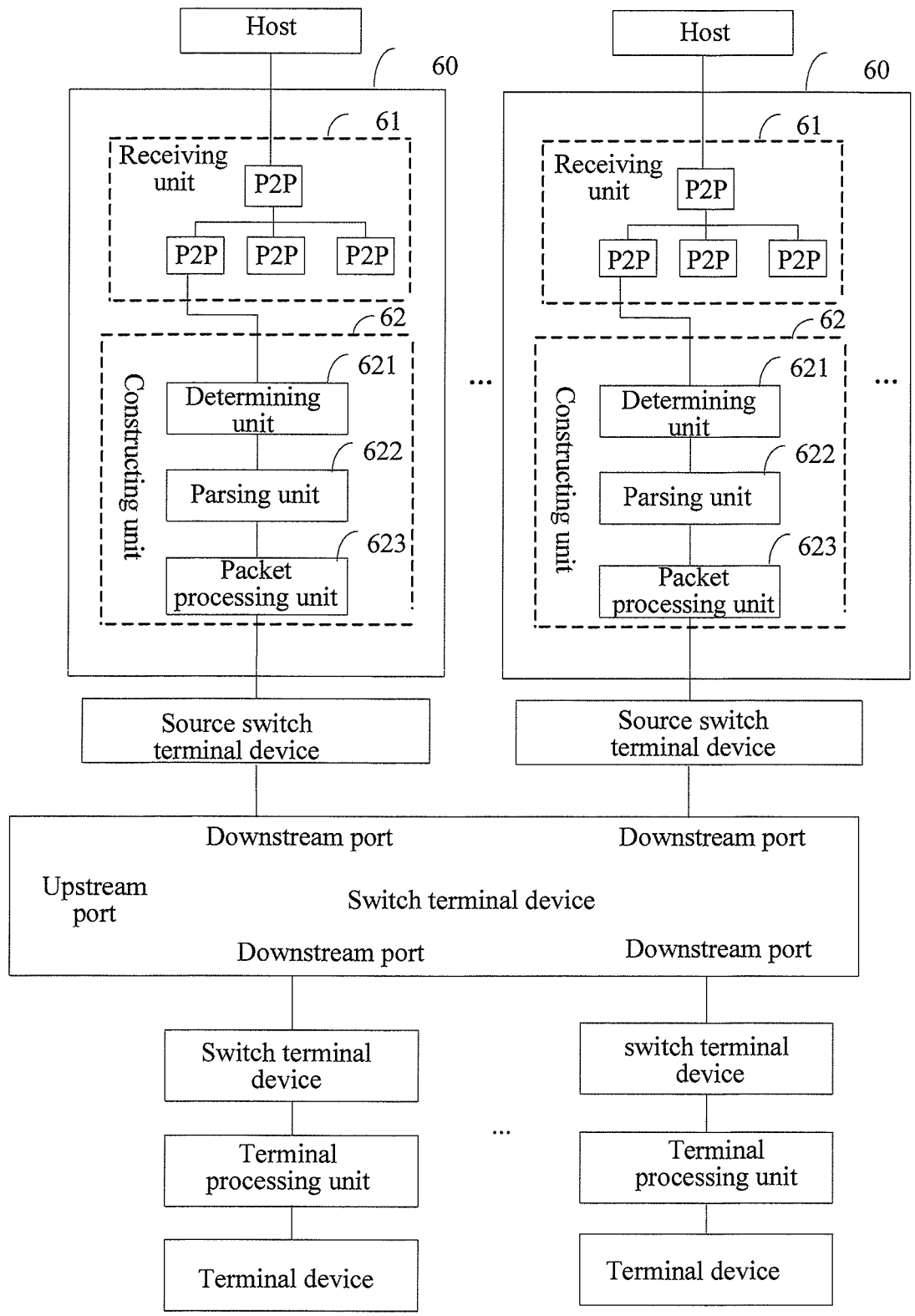
FIG. 6 is a schematic structural diagram of an apparatus for transmitting data based on PCIe according to Embodiment 4 of the present invention.

On a basis of the foregoing embodiments, this embodiment provides an apparatus 60 for transmitting data based on PCIe. FIG. 6 is a schematic structural diagram of an apparatus for transmitting data based on PCIe according to Embodiment 4 of the present invention. Refer to FIG. 6. The apparatus 60 provided in this embodiment includes:

a receiving unit 61, configured to receive a first PCIe data packet sent by a host, where the first PCIe data packet carries a data payload and terminal routing information of a destination terminal device, and the destination terminal device is a terminal device that needs to receive the PCIe data packet sent by the host; and a constructing unit 62, configured to determine, according to a stored second path rule and the terminal routing information, a destination switch terminal device that corresponds to the destination terminal device, where the second path rule includes a correspondence between the destination switch terminal device that needs to be passed through when the first PCIe data packet is transmitted according to a first path rule to the destination terminal device and the destination terminal device; construct, based on the first PCIe data packet received by the receiving unit, a second PCIe data packet that can be routed by using a PCIe switch from a source switch terminal device to the destination switch terminal device; and transmit the second PCIe data packet constructed by the constructing unit to the source switch terminal device, so that the source switch terminal device receives the second PCIe data packet and routes the second PCIe data packet according to the first path rule to the destination switch terminal device by using the PCIe switch, so that after receiving the second PCIe data packet the destination switch terminal device sends the second PCIe data packet to a destination terminal processing unit, and so that after receiving the second PCIe data packet the destination terminal processing unit parses the second PCIe data packet to obtain the data payload and sends the data payload to the destination terminal that connects to the destination terminal processing unit, where the first path rule includes a routing path for routing based on the PCIe switch between switch terminal devices that connect to the PCIe switch.

Further, the constructing unit 62 may specifically include:

a determining unit 621, configured to determine, according to the stored second path rule and the terminal routing information, the destination switch terminal device that corresponds to the destination terminal device;

a parsing unit 622, configured to parse the first PCIe data packet to acquire the terminal routing information and the data payload; and a packet processing unit 623, which connects to the parsing unit 622, configured to use, when the second PCIe data packet is being constructed, the terminal routing information of the destination terminal device and the data payload as a data payload of the second PCIe data packet, and add routing information of the destination switch terminal device that is determined by the determining unit, so that the second PCIe data packet can be routed from the source switch terminal device to the destination switch terminal device by using the PCIe switch.

Further, the receiving unit 61 includes a first P2P that has an upstream port, where the first P2P connects to an RC of the host by using the upstream port included by the first P2P, the host provides an RC function, and the first P2P is configured to receive the first PCIe data packet; and one or more second P2Ps, each of which has a downstream port, where each second P2P is configured to connect to a switch terminal device by using the downstream port included by each second P2P; and a second P2P is configured to transmit the second PCIe data packet constructed by the constructing unit to the source switch terminal device.

Because this embodiment is based on the foregoing embodiments, a specific processing method and a specific hardware implementation method of each unit in this embodiment may be based on the description of the foregoing embodiments, and no further details are provided herein.

Embodiment 5

Figure 7:
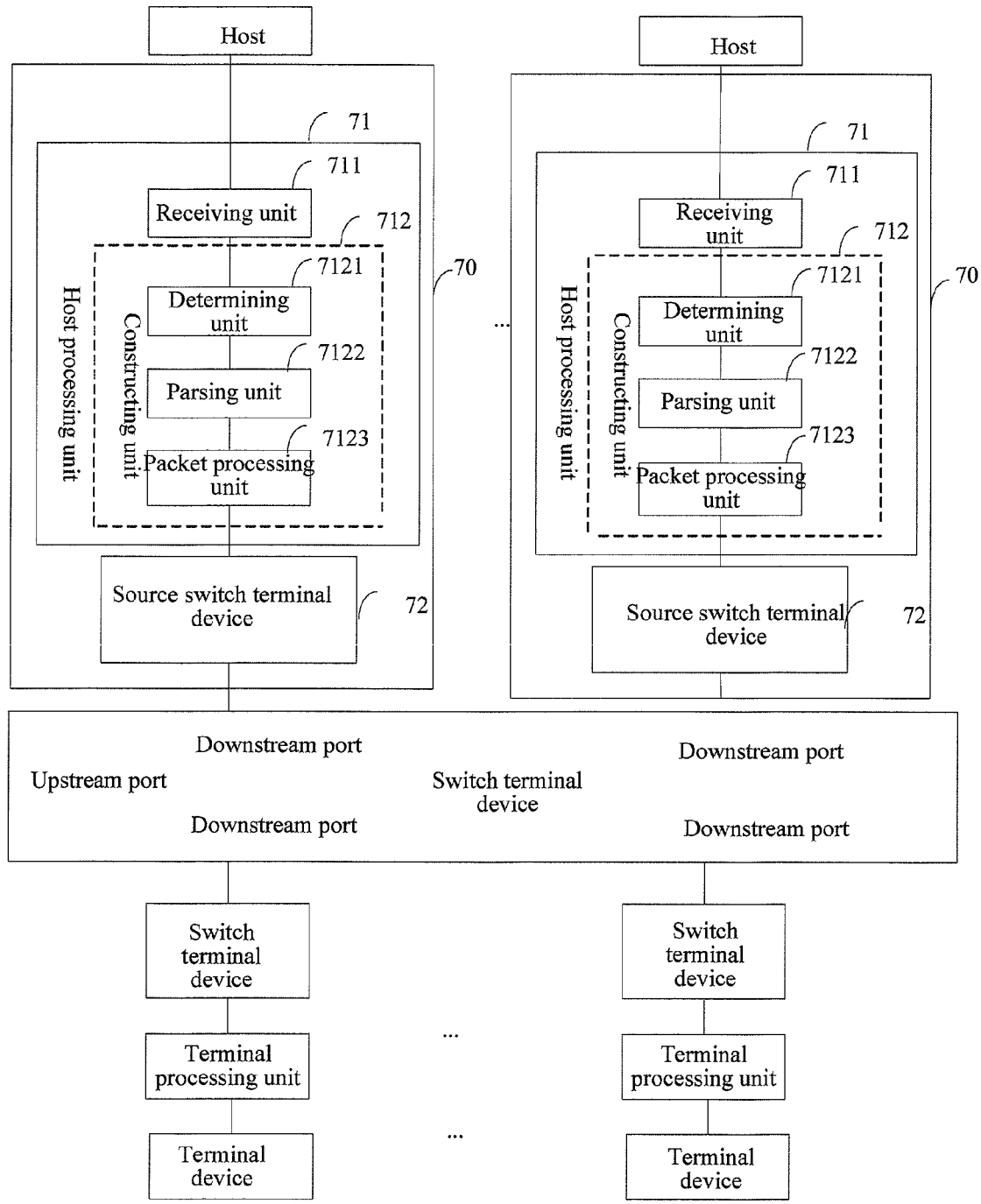
FIG. 7 is a schematic structural diagram of an apparatus for transmitting data based on PCIe according to Embodiment 5 of the present invention.

On a basis of the foregoing embodiments, this embodiment provides an apparatus 70 for transmitting data based on PCIe. FIG. 7 is a schematic structural diagram of an apparatus for transmitting data based on PCIe according to Embodiment 5 of the present invention. Refer to FIG. 7. The apparatus 70 provided in this embodiment includes:

a host processing unit 71, which receives a first PCIe data packet sent by a host that connects to the host processing unit 71, where the first PCIe data packet carries a data payload and terminal routing information of a destination terminal device; determines, according to a stored second path rule and the terminal routing information, a destination switch terminal device that corresponds to the destination terminal device; and constructs, based on the first PCIe data packet, a second PCIe data packet that can be routed from a source switch terminal device to the destination switch terminal device, and sends the second PCIe data packet, where the second path rule includes a correspondence between the destination switch terminal device that needs to be passed through when the host processing unit transmits the first PCIe data packet according to a first path rule to the destination terminal device and the destination terminal device, the destination terminal device is a terminal device that needs to receive the PCIe data packet sent by the host, and the first path rule includes a routing path for routing based on the PCIe switch between switch terminal devices that connect to the PCIe switch; and a source switch terminal device 72, which connects to the host processing unit, receives the second PCIe data packet from the host processing unit, and routes the second PCIe data packet by using the PCIe switch to the destination switch terminal device according to the first path rule, where the second PCIe data packet includes the data payload, so that after receiving the second PCIe data packet the destination switch terminal device sends the second PCIe data packet to a destination terminal processing unit, and so that after receiving the second PCIe data packet the destination terminal processing unit parses the second PCIe data packet to obtain the data payload and sends the data payload to the destination terminal that connects to the destination terminal processing unit, where the first path rule includes the routing path for the routing based on the PCIe switch between the switch terminal devices that connect to the PCIe switch.

Refer to FIG. 7. Further, the host processing unit 71 specifically includes:

a receiving unit 711, configured to receive the first PCIe data packet sent by the host, where the first PCIe data packet carries the data payload and the terminal routing information of the destination terminal device, and the destination terminal device is a terminal device that needs to receive the PCIe data packet sent by the host; and a constructing unit 712, configured to determine, according to the stored second path rule and the terminal routing information, the destination switch terminal device that corresponds to the destination terminal device; construct, based on the first PCIe data packet received by the receiving unit, the second PCIe data packet that can be routed by using the PCIe switch from the source switch terminal device to the destination switch terminal device; and transmit the second PCIe data packet constructed by the constructing unit to the source switch terminal device, where the second path rule includes the correspondence between the destination switch terminal device that needs to be passed through when the first PCIe data packet is transmitted according to the first path rule to the destination terminal device and the destination terminal device, and the first path rule includes the routing path for the routing based on the PCIe switch between the switch terminal devices that connect to the PCIe switch.

In the embodiment shown in FIG. 7, the constructing unit 712 specifically includes:

a determining unit 7121, configured to determine, according to the stored second path rule and the terminal routing information, the destination switch terminal device that corresponds to the destination terminal device;

a parsing unit 7122, configured to parse the first PCIe data packet to acquire the terminal routing information and the data payload; and a packet processing unit 7123, which connects to the parsing unit, configured to use, when the second PCIe data packet is being constructed, the terminal routing information of the destination terminal device and the data payload as a data payload of the second PCIe data packet, and add routing information of the destination switch terminal device that is determined by the determining unit, so that the second PCIe data packet can be routed from the source switch terminal device to the destination switch terminal device by using the PCIe switch.

Because this embodiment is based on the foregoing embodiments, a specific processing method and a specific hardware implementation method of each unit in this embodiment may be based on the description of the foregoing embodiments, and no further details are provided herein.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the scope of the technical solutions of the embodiments of the present invention.

What is claimed is:

1. A system for transmitting data based on Peripheral Component Interconnect Express (PCIe), the system comprising:

a PCIe switch comprising an upstream port and multiple downstream ports;

a managing unit, which connects to the upstream port of the PCIe switch;

multiple switch terminal devices, which separately connect to the multiple downstream ports in a one-to-one manner;

multiple host processing units, each configured to connect to a respective host, including at least a first host processing unit configured to connect to a first host; and multiple terminal processing units, configured to connect to terminal devices; wherein:

the multiple switch terminal devices further separately connect to the multiple host processing units or the multiple terminal processing units in a one-to-one manner;

the managing unit is configured to establish a first path rule that comprises a routing path for routing based on the PCIe switch between the switch terminal devices that connect to the PCIe switch;

the first host processing unit stores a second path rule that comprises a correspondence between a first destination switch terminal device that needs to be passed through when the first host processing unit transmits a first PCIe data packet according to the first path rule to a destination terminal device and the destination terminal device, the destination terminal device is a terminal device that needs to receive the first PCIe data packet sent by the first host, and the first destination switch terminal device is a switch terminal device that connects to the destination terminal device by using the terminal processing unit among the multiple switch terminal devices;

the first host processing unit is further configured to
receive the first PCIe data packet sent by the first host, wherein the first PCIe data packet carries a data payload and terminal routing information of the destination terminal device;

determine, according to the second path rule and the terminal routing information, the first destination switch terminal device that corresponds to the destination terminal device, and construct, based on the first PCIe data packet, a second PCIe data packet that can be routed from a first source switch terminal device to the first destination switch terminal device, wherein the first source switch terminal device is a switch terminal device that connects to the first host processing unit; and send the constructed second PCIe data packet to the first source switch terminal device, so that the first source switch terminal device routes the second PCIe data packet to the first destination switch terminal device according to the first path rule, wherein the second PCIe data packet comprises the data payload;

after receiving the second PCIe data packet, the first destination switch terminal device sends the second PCIe data packet to a destination terminal processing unit, wherein the destination terminal processing unit is a terminal processing unit that connects to the first destination switch terminal device among the multiple terminal processing units; and after receiving the second PCIe data packet, the destination terminal processing unit parses the second PCIe data packet to obtain the data payload and sends the data payload to the destination terminal device that connects to the destination terminal processing unit.

2. The system according to claim 1, wherein constructing, by the first host processing unit, based on the first PCIe data packet, the second PCIe data packet that can be routed from the first source switch terminal device to the first destination switch terminal device comprises:

parsing, by the first host processing unit, the first PCIe data packet to acquire the terminal routing information and the data payload; and when the first host processing unit is constructing the second PCIe data packet, using, by the first host processing unit, the terminal routing information of the destination terminal device and the data payload as a data payload of the second PCIe data packet, and adding routing information of the first destination switch terminal device, so that the second PCIe data packet can be routed from the first source switch terminal device to the first destination switch terminal device by using the PCIe switch.

3. The system according to claim 1, wherein:

the managing unit allocates, when the PCIe switch is powered on, corresponding device information to the switch terminal devices that connect to the PCIe switch, wherein the device information comprises a first BDF number and a first BAR space address;

the first path rule is a configuration table, wherein the configuration table comprises a routing path established according to the first BDF number or the first BAR space address between the switch terminal devices;

the first PCIe data packet further comprises: a PCIe data type; and the sending the constructed second PCIe data packet to the first source switch terminal device, so that the first source switch terminal device routes the second PCIe data packet to the first destination switch terminal device according to the first path rule comprises:

sending the constructed second PCIe data packet to the first source switch terminal device, so that the first source switch terminal device selects, according to the PCIe data type, the routing path established according to the first BDF number or the first BAR space address between the switch terminal devices from the configuration table, and routes the second PCIe data packet to the destination terminal device.

4. The system according to claim 1, wherein the managing unit is configured to:

perform PCIe initialization enumeration to allocate routing information to the switch terminal devices; and establish the first path rule according to the allocated routing information.

5. The system according to claim 4, wherein:

the first host processing unit is further configured to acquire, after the managing unit establishes the first path rule, the path between the switch terminal devices that is comprised in the first path rule; and the first host processing unit is further configured to generate, according to the path between the switch terminal devices that is comprised in the first path rule, the second path rule in a PCIe initialization enumeration process of the terminal devices, and store the second path rule, wherein the PCIe initialization enumeration process is initiated after the first path rule is established.

6. The system according to claim 1, wherein:

the first host processing unit comprises a constructing unit and multiple levels of P2Ps defined in a PCIe specification, wherein a first level of P2Ps comprises a first P2P, the first P2P is configured to connect to the first host, a second level of P2Ps comprises one or more second P2Ps, the first P2P connects to the one or more second P2Ps, and each second P2P connects to the constructing unit;

the first P2P is configured to receive the first PCIe data packet sent by the first host, select, according to the terminal routing information, a second P2P that connects to the first P2P, and send the first PCIe data packet to the constructing unit; and the constructing unit is configured to determine, according to the stored second path rule and the terminal routing information, the first destination switch terminal device that corresponds to the destination terminal device; construct, based on the first PCIe data packet received by the first host processing unit, the second PCIe data packet that can be routed from the first source switch terminal device to the first destination switch terminal device by using the PCIe switch; and transmit the second PCIe data packet to the first source switch terminal device, wherein the second path rule comprises the correspondence between the destination switch terminal device that needs to be passed through when the PCIe data packet is transmitted to the destination terminal device and the destination terminal device.

7. The system according to claim 1, wherein:

the terminal processing unit comprises a third path rule, wherein the third path rule comprises a correspondence between a second destination switch terminal device that needs to be passed through when the terminal processing unit sends a third PCIe data packet to a destination host and the destination host, the destination host is a host that needs to receive the third PCIe data packet sent by the terminal processing unit, and the second destination switch terminal device is a switch terminal device that connects to the destination host by using the first host processing unit;

the terminal processing unit is further configured to receive the third PCIe data packet sent by the terminal device that connects to the terminal processing unit, wherein the third PCIe data packet carries a data payload and host routing information of the destination host; determine, according to the third path rule and the host routing information, the second destination switch terminal device that corresponds to the destination host, and construct, based on the third PCIe data packet, a fourth PCIe data packet that can be routed from a second source switch terminal device to the second destination switch terminal device, wherein the second source switch terminal device is a switch terminal device that connects to the terminal processing unit; and send the constructed fourth PCIe data packet to the second source switch terminal device, so that the second source switch terminal device routes the fourth PCIe data packet to the second destination switch terminal device according to the first path rule, wherein the fourth PCIe data packet comprises the data payload;

after receiving the fourth PCIe data packet, the second destination switch terminal device sends the fourth PCIe data packet to a destination host processing unit, wherein the destination host processing unit is a host processing unit that connects to the second destination switch terminal device among the multiple host processing units; and after receiving the fourth PCIe data packet, the destination host processing unit parses the fourth PCIe data packet to obtain the data payload and sends the data payload to the destination host that connects to the destination host processing unit.

8. A method for transmitting data based on Peripheral Component Interconnect Express (PCIe), the method comprising:

receiving, by a first host processing unit, a first PCIe data packet sent by a first host that connects to the first host processing unit, wherein the first PCIe data packet carries a data payload and terminal routing information of a destination terminal device, and the destination terminal device is a terminal device that needs to receive the first PCIe data packet sent by the first host;

determining, according to a stored second path rule and the terminal routing information, a destination switch terminal device that corresponds to the destination terminal device, wherein the second path rule comprises a correspondence between the destination switch terminal device that needs to be passed through when the first host processing unit transmits the first PCIe data packet to the destination terminal device and the destination terminal device;

constructing, based on the first PCIe data packet, a second PCIe data packet that can be routed by using a PCIe switch from a source switch terminal device that connects to the first host processing unit to the destination switch terminal device; and sending the constructed second PCIe data packet to the source switch terminal device, so that the source switch terminal device routes the second PCIe data packet by using the PCIe switch to the destination switch terminal device according to a first path rule, wherein the second PCIe data packet comprises the data payload, so that after receiving the second PCIe data packet the destination switch terminal device sends the second PCIe data packet to a destination terminal processing unit that connects to the destination switch terminal device, and so that after receiving the second PCIe data packet the destination terminal processing unit parses the second PCIe data packet to obtain the data payload and sends the data payload to the destination terminal device that connects to the destination terminal processing unit, wherein the first path rule comprises a routing path for routing based on the PCIe switch between the switch terminal devices that connect to the PCIe switch, the source switch terminal device is a switch terminal device that connects to the first host processing unit, and the destination terminal processing unit is a terminal processing unit that connects to the destination switch terminal device.

9. The method according to claim 8, wherein:

constructing, based on the first PCIe data packet, the second PCIe data packet that can be routed by using a PCIe switch from a source switch terminal device that connects to the first host processing unit to the destination switch terminal device comprises:

parsing the first PCIe data packet to acquire the terminal routing information and the data payload; and when the second PCIe data packet is being constructed, using the terminal routing information of the destination terminal device and the data payload as a data payload of the second PCIe data packet, and adding routing information of the destination switch terminal device, so that the second PCIe data packet can be routed from the source switch terminal device to the destination switch terminal device by using the PCIe switch.

10. The method according to claim 8, wherein:

the first PCIe data packet further comprises: a PCIe data type; and sending the constructed second PCIe data packet to the source switch terminal device, so that the source switch terminal device routes the second PCIe data packet by using the PCIe switch to the destination switch terminal device according to the first path rule comprises:

sending the constructed second PCIe data packet to the source switch terminal device, so that the source switch terminal device selects, according to the PCIe data type, the routing path established according to a first BDF number or a first BAR space address between the switch terminal devices from a configuration table, and routes the second PCIe data packet to the destination terminal device; wherein:

the configuration table is used to denote the first path rule, the configuration table comprises the routing path established according to the first BDF number or the first BAR space address between the switch terminal devices, and the first BDF number and the first BAR space address are obtained when they are allocated, during power-on of the PCIe switch, by a managing unit to the switch terminal devices that connect to the PCIe switch.

11. The method according to claim 8, wherein the first path rule is established by the managing unit according to allocated routing information, the managing unit connects to an upstream port of the PCIe switch, and the routing information is allocated by the managing unit to the switch terminal devices by using PCIe initialization enumeration.

12. The method according to claim 8, further comprising:

acquiring, by the first host processing unit after the first path rule is established, the path between the switch terminal devices that is comprised in the first path rule; and generating the second path rule in a PCIe initialization enumeration process of the terminal devices, and storing the second path rule, wherein the PCIe initialization enumeration process is initiated by the first host after the first path rule is established.

13. An apparatus for transmitting data based on Peripheral Component Interconnect Express (PCIe), the apparatus comprising:

a receiving unit, configured to receive a first PCIe data packet sent by a first host, wherein the first PCIe data packet carries a data payload and terminal routing information of a destination terminal device, and the destination terminal device is a terminal device that needs to receive the PCIe data packet sent by the first host; and a constructing unit, configured to determine, according to a stored second path rule and the terminal routing information, a destination switch terminal device that corresponds to the destination terminal device, wherein the second path rule comprises a correspondence between the destination switch terminal device that needs to be passed through when the first PCIe data packet is transmitted according to a first path rule to the destination terminal device and the destination terminal device; construct, based on the first PCIe data packet received by the receiving unit, a second PCIe data packet that can be routed by using a PCIe switch from a source switch terminal device to the destination switch terminal device; and transmit the second PCIe data packet constructed by the constructing unit to the source switch terminal device, so that the source switch terminal device receives the second PCIe data packet and routes the second PCIe data packet according to the first path rule to the destination switch terminal device by using the PCIe switch, so that after receiving the second PCIe data packet the destination switch terminal device sends the second PCIe data packet to a destination terminal processing unit, and so that after receiving the second PCIe data packet the destination terminal processing unit parses the second PCIe data packet to obtain the data payload and sends the data payload to the destination terminal that connects to the destination terminal processing unit, wherein the first path rule comprises a routing path for routing based on the PCIe switch between the switch terminal devices that connect to the PCIe switch.

14. The apparatus according to claim 13, wherein the constructing unit comprises:
a determining unit, configured to determine, according to the stored second path rule and the terminal routing information, the destination switch terminal device that corresponds to the destination terminal device;
a parsing unit, configured to parse the first PCIe data packet to acquire the terminal routing information and the data payload; and
a packet processing unit, which connects to the parsing unit, configured to use, when the second PCIe data packet is being constructed, the terminal routing information of the destination terminal device and the data payload as a data payload of the second PCIe data packet, and add routing information of the destination switch terminal device that is determined by the determining unit, so that the second PCIe data packet can be routed from the source switch terminal device to the destination switch terminal device by using the PCIe switch.

15. The apparatus according to claim 13, wherein:
the receiving unit comprises multiple levels of P2Ps defined in a PCIe specification, wherein a first level of P2Ps comprises a first P2P, the first P2P is configured to connect to the first host, a second level of P2Ps comprises one or more second P2Ps, the first P2P connects to the one or more second P2Ps, and each second P2P connects to the constructing unit; and
the first P2P is configured to receive the first PCIe data packet sent by the first host, select, according to the terminal routing information, a second P2P that connects to the first P2P, and send the first PCIe data packet to the constructing unit.

16. An apparatus for transmitting data based on Peripheral Component Interconnect Express (PCIe), the apparatus comprising:
a first host processing unit, which receives a first PCIe data packet sent by a first host that connects to the first host processing unit, wherein the first PCIe data packet carries a data payload and terminal routing information of a destination terminal device; determines, according to a stored second path rule and the terminal routing information, a destination switch terminal device that corresponds to the destination terminal device; and constructs, based on the first PCIe data packet, a second PCIe data packet that can be routed from a source switch terminal device to the destination switch terminal device, and sends the second PCIe data packet, wherein the second path rule comprises a correspondence between the destination switch terminal device that needs to be passed through when the first host processing unit transmits the first PCIe data packet according to a first path rule to the destination terminal device and the destination terminal device, the destination terminal device is a terminal device that needs to receive the PCIe data packet sent by the first host, and the first path rule comprises a routing path for routing based on a PCIe switch between the switch terminal devices that connect to the PCIe switch; and
a source switch terminal device, which connects to the first host processing unit, receives the second PCIe data packet from the first host processing unit, and routes the second PCIe data packet by using the PCIe switch to the destination switch terminal device according to the first path rule, wherein the second PCIe data packet comprises the data payload, so that after receiving the second PCIe data packet the destination switch terminal device sends the second PCIe data packet to a destination terminal processing unit, and so that after receiving the second PCIe data packet the destination terminal processing unit parses the second PCIe data packet to obtain the data payload and sends the data payload to the destination terminal that connects to the destination terminal processing unit, wherein the first path rule comprises the routing path for the routing based on the PCIe switch between the switch terminal devices that connect to the PCIe switch.

17. The apparatus according to claim 16, wherein the first host processing unit comprises:
a receiving unit, configured to receive the first PCIe data packet sent by the first host, wherein the first PCIe data packet carries the data payload and the terminal routing information of the destination terminal device, and the destination terminal device is a terminal device that needs to receive the first PCIe data packet sent by the first host; and
a constructing unit, configured to determine, according to the stored second path rule and the terminal routing information, the destination switch terminal device that corresponds to the destination terminal device; construct, based on the first PCIe data packet received by the receiving unit, the second PCIe data packet that can be routed by using the PCIe switch from the source switch terminal device to the destination switch terminal device; and transmit the second PCIe data packet constructed by the constructing unit to the source switch terminal device, wherein the second path rule comprises the correspondence between the destination switch terminal device that needs to be passed through when the first PCIe data packet is transmitted according to the first path rule to the destination terminal device and the destination terminal device, and the first path rule comprises the routing path for the routing based on the PCIe switch between the switch terminal devices that connect to the PCIe switch.

18. The apparatus according to claim 17, wherein the constructing unit comprises:
a determining unit, configured to determine, according to the stored second path rule and the terminal routing information, the destination switch terminal device that corresponds to the destination terminal device;

a parsing unit, configured to parse the first PCIe data packet to acquire the terminal routing information and the data payload; and a packet processing unit, which connects to the parsing unit, configured to use, when the second PCIe data packet is being constructed, the terminal routing information of the destination terminal device and the data payload as a data payload of the second PCIe data packet, and add routing information of the destination switch terminal device that is determined by the determining unit, so that the second PCIe data packet can be routed from the source switch terminal device to the destination switch terminal device by using the PCIe switch.

* * * * *